United States Patent
Nifong et al.

(10) Patent No.: US 9,881,114 B2
(45) Date of Patent: Jan. 30, 2018

(54) VIRTUAL HIERARCHICAL LAYER PROPAGATION

(71) Applicant: Synopsys, Inc., Mountain View, CA (US)

(72) Inventors: Gary B Nifong, Durham, NC (US); Jun Chen, Cary, NC (US); Karthikeyan Muthalagu, Morrisville, NC (US); James Lewis Nance, Raleigh, NC (US); Zhen Ren, Morrisville, NC (US); Ying Shi, Chapel Hill, NC (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/719,996

(22) Filed: May 22, 2015

(65) Prior Publication Data

US 2015/0339434 A1    Nov. 26, 2015

Related U.S. Application Data

(60) Provisional application No. 62/002,808, filed on May 24, 2014, provisional application No. 62/006,069, (Continued)

(51) Int. Cl.
*G06F 17/50* (2006.01)

(52) U.S. Cl.
CPC .......... *G06F 17/5072* (2013.01); *G06F 17/50* (2013.01); *G06F 17/5009* (2013.01);
(Continued)

(58) Field of Classification Search
CPC ............. G06F 17/5081; G06F 17/5072; G06F 2217/12
(Continued)

(56) References Cited

U.S. PATENT DOCUMENTS 5,281,558 A    1/1994   Bamji et al.
5,309,371 A    5/1994   Shikata et al.
(Continued)

OTHER PUBLICATIONS

U.S. Appl. No. 14/604,694, Non-Final Office Action dated Nov. 19, 2015.
(Continued)

*Primary Examiner* — Phallaka Kik
(74) *Attorney, Agent, or Firm* — Alston & Bird LLP

(57) ABSTRACT

Simulation and verification are critical to analyzing a semiconductor design using design rule checking (DRC) to verify design rules for manufacturing (DRM). The efficient use of computational resources including runtimes and resource requirements is a key component of the analysis. A virtual hierarchical layer (VHL) with shapes is generated for the design analysis of a design, including cells and hierarchical design levels. A cell and multiple instances of the cell are identified in the design. A VHL based on polygons overlapping the cell is generated in response to an algorithmic operation. The VHL shapes are propagated to subsequent algorithmic operations. The algorithmic operations update the VHL shapes. Shapes are filtered out of the VHL shapes as part of the updating. The VHL shapes are propagated through a chain of operations.

28 Claims, 11 Drawing Sheets

Related U.S. Application Data filed on May 31, 2014, provisional application No. 62/006,657, filed on Jun. 2, 2014, provisional application No. 62/006,083, filed on May 31, 2014, provisional application No. 62/006,607, filed on Jun. 2, 2014, provisional application No. 62/006,092, filed on May 31, 2014.

(52) U.S. Cl.
 CPC ...... *G06F 17/5081* (2013.01); *G06F 2217/12* (2013.01); *Y02P 90/265* (2015.11)

(58) Field of Classification Search
 USPC .................. 716/112, 55, 54, 51, 118; 703/15
 See application file for complete search history.

(56) References Cited

U.S. PATENT DOCUMENTS

| | | | |
|---|---|---|---|
| 5,493,510 A | 2/1996 | Shikata | |
| 5,528,508 A | 6/1996 | Russell et al. | |
| 5,559,718 A | 9/1996 | Baisuck et al. | |
| 6,009,250 A * | 12/1999 | Ho | G06F 17/5081 716/52 |
| 6,009,251 A * | 12/1999 | Ho | G06F 17/5081 716/102 |
| 6,011,911 A * | 1/2000 | Ho | G06F 17/5081 716/112 |
| 6,035,113 A | 3/2000 | Gerber et al. | |
| 6,047,116 A | 4/2000 | Murakami et al. | |
| 6,275,971 B1 | 8/2001 | Levy | |
| 6,289,412 B1 | 9/2001 | Yuan et al. | |
| 6,363,516 B1 | 3/2002 | Cano et al. | |
| 6,543,039 B1 | 4/2003 | Watanabe | |
| 6,629,304 B1 | 9/2003 | Gasanov et al. | |
| 6,730,463 B2 | 5/2004 | Heissmeier et al. | |
| 6,845,494 B2 | 1/2005 | Burks et al. | |
| 6,886,148 B2 | 4/2005 | Solomon | |
| 6,969,837 B2 | 11/2005 | Ye | |
| 7,103,863 B2 | 9/2006 | Riepe et al. | |
| 7,146,583 B1 | 12/2006 | Sun et al. | |
| 7,149,989 B2 | 12/2006 | Lakshmanan | |
| 7,155,440 B1 | 12/2006 | Kronmiller et al. | |
| 7,415,694 B2 | 8/2008 | Mayhew | |
| 7,418,693 B1 * | 8/2008 | Gennari | G06F 17/5068 716/55 |
| 7,461,359 B1 * | 12/2008 | Nequist | G06F 17/5068 716/104 |
| 7,847,937 B1 | 12/2010 | Bevis | |
| 7,873,204 B2 | 1/2011 | Wihl et al. | |
| 7,873,585 B2 | 1/2011 | Izikson | |
| 7,984,395 B2 | 7/2011 | Cork | |
| 8,019,561 B1 | 9/2011 | Sahrling | |
| 8,453,091 B1 | 5/2013 | Rao et al. | |
| 8,539,416 B1 | 9/2013 | Rossman et al. | |
| 8,799,833 B2 | 8/2014 | Wann et al. | |
| 9,405,879 B2 | 8/2016 | Wang et al. | |
| 9,454,635 B2 | 9/2016 | Oberai | |
| 9,740,811 B2 | 8/2017 | Chen et al. | |
| 9,740,812 B2 | 8/2017 | Nance et al. | |
| 2002/0046392 A1 | 4/2002 | Ludwig et al. | |
| 2003/0163795 A1 | 8/2003 | Morgan et al. | |
| 2003/0229882 A1 | 12/2003 | Ludwig et al. | |
| 2005/0076316 A1 | 4/2005 | Pierrat et al. | |
| 2005/0183053 A1 | 8/2005 | Ishizuka | |
| 2005/0235245 A1 | 10/2005 | Kotani et al. | |
| 2006/0136856 A1 | 6/2006 | Tang et al. | |
| 2008/0046849 A1 * | 2/2008 | Choi | G06F 17/5068 716/53 |
| 2008/0127016 A1 | 5/2008 | Ishikawa | |
| 2008/0155485 A1 | 6/2008 | Lin et al. | |
| 2008/0244493 A1 * | 10/2008 | Finkler | G06F 17/5068 716/119 |
| 2009/0089720 A1 * | 4/2009 | Nequist | G06F 17/5045 716/100 |
| 2009/0210845 A1 | 8/2009 | Malgioglio et al. | |
| 2009/0216450 A1 * | 8/2009 | Sakamoto | B82Y 10/00 702/1 |
| 2009/0287440 A1 | 11/2009 | Kulkarni | |
| 2009/0310870 A1 | 12/2009 | Monkowski | |
| 2010/0238433 A1 | 9/2010 | Lange et al. | |
| 2010/0251202 A1 | 9/2010 | Pierrat | |
| 2014/0215422 A1 | 7/2014 | Juneja et al. | |
| 2015/0089457 A1 | 3/2015 | Agarwal et al. | |
| 2015/0213189 A1 | 7/2015 | Oberai | |
| 2015/0339426 A1 * | 11/2015 | Nifong | G06F 17/5072 716/123 |
| 2015/0339430 A1 * | 11/2015 | Nifong | G06F 17/5072 716/112 |
| 2015/0339431 A1 * | 11/2015 | Chen | G06F 17/5072 716/112 |
| 2015/0339432 A1 * | 11/2015 | Nance | G06F 17/5072 716/106 |
| 2015/0339433 A1 * | 11/2015 | Nifong | G06F 17/5072 716/106 |

OTHER PUBLICATIONS

U.S. Appl. No. 14/604,694, Notice of Allowance dated Jun. 2, 2016.
U.S. Appl. No. 14/634,695, Final Office Action dated Dec. 14, 2016.
U.S. Appl. No. 14/634,695, Non-Final Office Action dated Jul. 1, 2016.
U.S. Appl. No. 14/673,064, Final Office Action dated Sep. 26, 2016.
U.S. Appl. No. 14/673,064, Non-Final Office Action dated Jun. 8, 2016.
U.S. Appl. No. 14/673,064, Notice of Allowance dated Nov. 14, 2016.
U.S. Appl. No: 14/673,709, Final Office Action dated Sep. 23, 2016.
U.S. Appl. No. 14/673,709, Non-Final Office Action dated Jun. 2, 2016.
U.S. Appl. No. 14/673,709, Notice of Allowance dated Nov. 8, 2016.
U.S. Appl. No. 14/713,716, Final Office Action dated Jan. 9, 2017.
U.S. Appl. No. 14/713,716, Non-Final Office Action dated Aug. 11, 2016.
U.S. Appl. No. 14/673064, Notice of Allowance dated Mar. 8, 2017.
U.S. Appl. No. 14/673,709, Notice of Allowance dated Mar. 2, 2017.
U.S. Appl. No. 14/713.,488, Non-Final Office Action dated Mar. 2, 2017.
U.S. Appl. No. 14/634,695, Non-Final Office Action dated Jul. 14, 2017.
U.S. Appl. No. 14/673,064, Notice of Allowance dated Apr. 26, 2017.
U.S. Appl. No. 14/673,709, Notice of Allowance dated Apr. 12, 2017.
U.S. Appl. No. 14/713,716, Non-Final Office Action dated Aug. 10, 2017.
U.S. Appl. No. 61/931,571, filed Jan. 25, 2014, Expired.
U.S. Appl. No. 62/002,808, filed May 24, 2014, Expired.
U.S. Appl. No. 62/006,069, filed May 31, 2014, Expired.
U.S. Appl. No. 62/006,083, filed May 31, 2014, Expired.
U.S. Appl. No. 62/006,092, filed May 31, 2014, Expired.
U.S. Appl. No. 62/006,657, filed Jun. 2, 2014, Expired.
U.S. Appl. No. 62/006,607, filed Jun. 2, 2014, Expired.

* cited by examiner

VIRTUAL HIERARCHICAL LAYER PROPAGATION

RELATED APPLICATIONS

This application claims the benefit of U.S. provisional patent applications "Virtual Hierarchical Layer Usage" Ser. No. 62/002,808, filed May 24, 2014, "Virtual Hierarchical Layer Patterning" Ser. No. 62/006,069, filed May 31, 2014, "Virtual Cell Model Geometry Compression" Ser. No. 62/006,657, filed Jun. 2, 2014, "Negative Plane Usage with a Virtual Hierarchical Layer" Ser. No. 62/006,083, filed May 31, 2014, "Virtual Cell Model Usage" Ser. No. 62/006,607, filed Jun. 2, 2014, and "Virtual Hierarchical Layer Propagation" Ser. No. 62/006,092, filed May 31, 2014. Each of the foregoing applications are hereby incorporated by reference in their entirety.

FIELD OF ART

This application relates generally to semiconductor circuit design and more particularly to verification of semiconductor designs using virtual hierarchical layer propagation.

BACKGROUND

One of the steps in the design process of a semiconductor design for an integrated circuit (IC) is the physical verification process, which is typically highly automated. The physical verification process for an integrated circuit (IC) is a design step taken by semiconductor manufacturers before commencing the fabrication of an IC. Semiconductor foundries define a set of design rules for manufacturing (DRM) for IC designers to follow in order to ensure successful manufacture and high yield of a design during the fabrication process. The high degree of complexity of modern ICs, which can contain billions of transistors and other electronic structures such as resistors, capacitors, diodes, and interconnecting conductors, requires that designers have a way to test the interactions between the billions of features before proceeding to manufacture. To this end, the DRM are defined as a set of geometric relationships between manufacturing layers, layers which in turn are used to create an IC. A physical design layout can include hundreds of layers used during the fabrication process to create transistors and electrical interconnect in the IC. The semiconductor process has grown in complexity and providing a DRM allows pre-fabrication checks to be performed on the thousands of rules present in the physical design. A design rule checking (DRC) physical verification tool is an industry standard process for checking the numerous relational and spatial rules defined in the DRM for a semiconductor design.

The DRM can define many different parameters, such as width, spacing, angle, enclosure, density, and electrical connectivity rules for design layers, which in turn are translated into a DRC runset. A DRC runset is defined as a set of DRC operations that verify the required DRM rules. A DRC tool provides a set of operations, or commands, which a designer uses to build a sequence of DRC commands to satisfy each DRM rule, e.g. a command might be selected to verify that a minimum distance is maintained between certain types of features. DRM rules commonly result in a DRC runset with 20,000 or more DRC commands for technology nodes smaller than 28 nanometers (nm). Modern DRC physical verification tools have a large suite of geometric and electrical commands to effectively implement the complex DRM rules. Many of these geometric and electrical commands result in the implementation of a unique algorithm that is not shared between individual commands, thus resulting in a very complex DRC tool with many algorithms.

Large ICs are typically built using a hierarchical method that begins with the creation of small child cells which are combined into larger parent cells, which then are successively used to build larger and larger cells to create a hierarchically organized IC design. Physical verification tools take advantage of the hierarchy in a design to efficiently process today's extremely large designs. Various forms of flattening processes are an alternative to hierarchical processing, but flattening processes can result in very large increases in processing time and are often not feasible for design verification.

SUMMARY

Simulation and verification of a semiconductor design represent stages in design analysis that can include design rule checking (DRC) being implemented to verify design rules for manufacturing (DRM) correlation in the design. A virtual hierarchical layer (VHL) including shapes can be generated for the design analysis of a design, which can include cells and hierarchical design levels. A cell and multiple instances of the cell can be identified in the design. A VHL based on polygons overlapping the cell can be generated in response to an algorithmic operation. The VHL shapes can be propagated to subsequent algorithmic operations. The algorithmic operations can update the VHL shapes. Shapes can be filtered out of the VHL shapes as part of the updating. The VHL shapes can be propagated through a chain of operations. A computer-implemented method for design analysis is disclosed comprising: identifying a cell and multiple instances of the cell within a semiconductor design that includes a plurality of cells and a plurality of hierarchical design levels where the cell and the multiple instances of the cell comprise the plurality of cells; generating virtual hierarchical layer (VHL) shapes, based on polygons which overlap the cell, in response to an algorithm operation; and propagating the VHL shapes to a subsequent algorithm operation. The method can include performing a coordinate transformation, as part of the updating of the VHL shapes, in order to put the VHL shapes onto common coordinates. In embodiments, the method includes filtering out shapes that will not be included as part of the updating of the VHL shapes. In some embodiments, the method includes identifying one or more polygons that, when combined, are larger than an area specified by the area command; and associating the one or more polygons that are larger than the area specified by the area command with a negative selector model.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Configuration Overview

Figure 1:
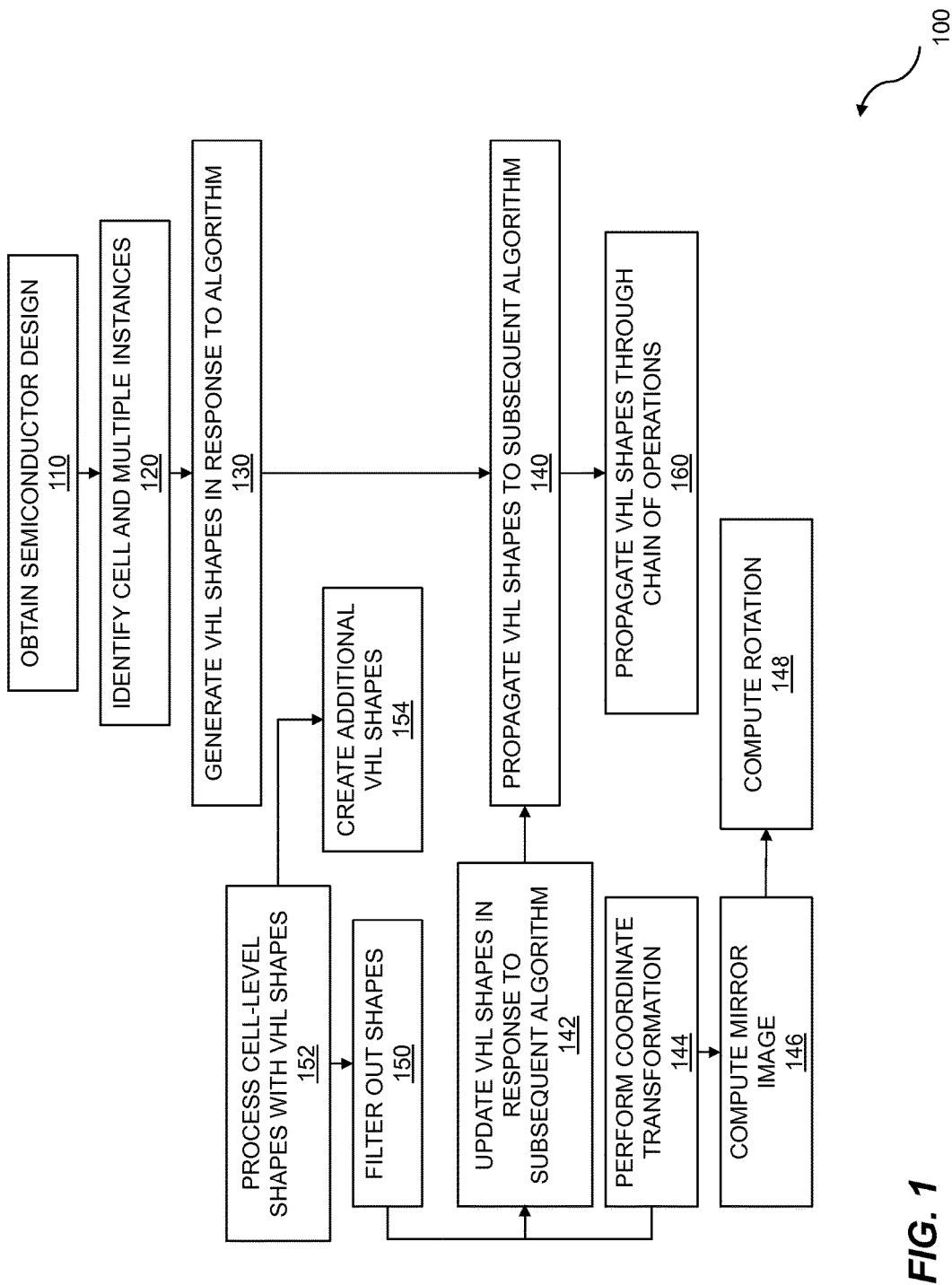
FIG. 1 is a flow diagram for virtual hierarchical layer propagation.

In order to facilitate efficient IC design processing and verification, a new type of hierarchical geometric layer called the virtual hierarchical layer (VHL) can be built for use in a fast, memory efficient, hierarchical verification algorithm. The VHL has the property of encompassing the global hierarchical information of an IC design layer contained within a cell, which reduces the DRC algorithms' need to traverse up and down the hierarchy to find potential interactions, and thus violations or issues. The VHL can be generated for each input layer of each DRC command. As an example, a runset can include a chain of two DRC commands where the output of the first command is the input of the second command. In this case, the VHL algorithm for the first command uses a VHL associated with its input layer and the VHL algorithm for the second command uses a VHL associated with its input layer, which coincides with the first command's output layer.

VHL propagation reduces the computational overhead of VHL generation procedures by incorporating the VHL generation as part of a VHL algorithm instead of performing independent generation each time the VHL is needed. The VHL propagation takes advantage of the relationship between the output layer and the input layer of a VHL algorithm, and generates the output VHL at the same time the output results are computed. As a result, the total number of separate VHL generation procedures is reduced, and the overall performance of hierarchical verification is increased.

Hierarchical physical verification of an integrated circuit (IC) is a complex process due to a multitude of hierarchical design styles that are created by IC design companies and other IC industry tools. The different design styles often result in extremely complex designs many levels deep that contain billions of cells and polygons overlapping each other throughout the hierarchy. In many verification methods, a hierarchical verification tool collapses the inefficient cell hierarchies and merges duplicate polygons to build a new hierarchy for the tool's individual command algorithms. Once the hierarchical tool builds its new hierarchy, then the layers stored at various levels of the newly-built hierarchy are processed in relation to each other based on the definition of the design rules and the unique geometric algorithms needed to implement them. For example, a design rules for manufacturing (DRM) rule for a certain IC can require verification to be performed by executing a sequence of commands (algorithms) in a design rule checking (DRC) runset, with each algorithm in the sequence cycling through proximal layers in the hierarchy to produce a hierarchical result which then feeds subsequent commands until the DRM rule is satisfied. An algorithm can have many optimizations which have been designed to avoid flattening the algorithm's result (output layer). Without these algorithmic optimizations, hierarchical data flattening can cause the DRC algorithms to lose flexibility in processing by forcing cell data into ever-larger chunks and creating extra processing time for the current algorithm and subsequent algorithms in the DRM rule.

Some hierarchical DRC methods are dependent on having the majority of the IC design layers loaded in memory before beginning the hierarchical algorithmic cycles that perform geometric operations on design data throughout the hierarchy in order to test conformity to the DRM. A hierarchical DRC method that loads an entire design layer has the advantage of having all of the instantiated cell data available in machine memory while cycling the geometric shapes throughout the hierarchy, which can result in reduced algorithm complexity. The implementation of such a hierarchical algorithm involves cycling design layers through the hierarchy while searching for algorithmic interactions of geometric shapes. The hierarchical cycling is typically performed as either single-layer cycling, dual-layer cycling, or for some complex algorithms, N-layer cycling. As the layer count increases for a hierarchical algorithm, so does the memory requirement, which becomes problematic for larger and larger designs. In fact, given the rapidly increasing size of modern IC designs, loading an entire design layer requires more memory than is feasible.

In response to the massive memory requirement of loading an entire layer, several hierarchical DRC methods load only partial layers into memory, which reduces memory requirements for the hierarchical algorithms but increases algorithmic complexity and data loading time. For example, data loading time increases if all the layer data of a cell is not able to be kept in memory and the data must be reloaded every time one of the cell's multiple instantiations interacts with a hierarchical geometric shape under examination. Additionally, reloading the interacting data many times becomes a significant CPU performance issue. In the case of a cell, cell A, which has its data instantiated multiple times in a hierarchical design and cell data that has not been pre-loaded into memory, every time a polygon from a given hierarchical layer is cycled through the hierarchy and interacts with an instantiation of cell A, cell A's data has to be reloaded dynamically from disk, resulting in significant CPU I/O. As the alternative method of loading the entire design layer into machine memory has already been mentioned as infeasible given the increasing complexity and decreasing node size of modern semiconductor designs, virtual hierarchical layers are herein presented as an alternative. Virtual hierarchical layers eliminate dynamic cell reloading, eliminate the need to load an entire IC design layer into memory, and provide a mechanism for cell-level, bottom-up algorithms for processing hierarchical layers.

Current hierarchical DRC methodologies typically exhibit a performance tradeoff between memory consumption and dynamic data load time. The Virtual Hierarchical Layer (VHL) described in U.S. patent application "Virtual Hierarchical Layer Usage" Ser. No. 14/634,695, filed Feb. 27, 2015, which is hereby incorporated by reference in its entirety, describes a method to reduce both memory and data load time by providing a bottom up cell-level processing technique using a VHL. A VHL provides a snapshot of the hierarchical overlapping of shapes for a particular cell in a semiconductor design. U.S. patent application "Virtual Hierarchical Layer Patterning" Ser. No. 14/673,064, filed Mar. 30, 2015, which is hereby incorporated by reference in its entirety, describes a particular type of optimized virtual hierarchical layer (VHL) called a virtual hierarchical layer identical (VHLi). A virtual hierarchical layer identical (VHLi) includes geometric shapes that convey identical layer patterns encompassing global hierarchical information for all instances of a particular integrated circuit (IC) design cell. Methods of compressing VHL files are described in U.S. patent application "Virtual Cell Model Geometry Compression" Ser. No. 14/673,709, filed Mar. 30, 2015, which is hereby incorporated by reference in its entirety. Compression of the VHL data can reduce the memory footprint and computational resources required for the DRC process. A technique for generating a VHL is described in U.S. patent application "Negative Plane Usage with a Virtual Hierarchical Layer" Ser. No. 14/713,488, filed May 15, 2015, which is hereby incorporated by reference in its entirety. A negative plane is created and polygons which overlap an instance of a cell are pushed into the negative plane to create holes in the plane. The holed negative plane is then inverted to create the VHL. U.S. patent application "Virtual Cell Model Usage" Ser. No. 14/713,716 filed May 15, 2015, which is hereby incorporated by reference in its entirety, describes how to create a virtual cell model using VHL. The virtual cell model can use multiple channels to carry model data from the cell to the parent cell.

Embodiments of the VHL create a hierarchical geometric layer for the purpose of performing an efficient hierarchical DRC process for verification of an IC design before the design proceeds to a fabrication stage in one of many possible semiconductor manufacturing processes. In one embodiment, the hierarchical geometric layers in an IC design are used to generate the VHL for a current cell from a combination of rectangles, trapezoids, and other shapes that reside in the hierarchy above the cell, as well as from geometric shapes in non-descendant sibling cells that interact with the cell.

The hierarchical information can be collected by finding any geometric shape not contained by the cell (i.e., not in the current cell or in any of its descendants) that is overlapping any hierarchical placement of the current cell. The obtained hierarchical information is then used to compute the VHL. To gather the necessary geometric information regarding overlaps, all cells in the hierarchy are processed against the current cell's boundary. A two-step procedure is used for the hierarchical information propagation in some embodiments. First, it is determined whether or not the cell being processed can overlap with the current cell. Then, if there is a potential overlap, the geometric shapes in the cell are checked, and the shapes overlapping the current cell's boundary are collected. This two-step procedure falls into one of four cases, according to a hierarchical cell's relationship with the current cell:

1) If the cell being processed is the direct ancestor of the current cell, the cell can contain geometric shapes that overlap with one or more placements of the current cell. Therefore, the shapes of the direct ancestor cell being processed which overlap with the current cell are collected for the VHL generation.

2) If the cell being processed is a direct sibling of the current cell, one or more of the placements of the cell being processed can overlap with one or more placements of the current cell. In this case, the sibling cell being processed can still contain geometric shapes that overlap with the current cell, so the shapes of the direct sibling cell being processed are collected for the VHL generation. Some embodiments can check to see if the cell boundaries overlap before processing the geometric shapes of the sibling cells.

3) If the cell being processed is an indirect sibling of the current cell, the indirect sibling cell, by definition, shares one or more common ancestor cells with the current cell in the hierarchy. As with a direct sibling cell, common ancestor cells can be used to determine whether the cell being processed has placements that overlap with any of the current cell's placements. If any overlapping exists, the geometric shapes in indirect sibling cell that overlap with the current cell are collected for the VHL generation.

4) If the cell being processed is the direct descendant of the current cell, none of its data is collected for the VHL generation.

Once the hierarchical information has been collected, the VHL is calculated for the cell. Because the previously described procedures collect geometric shapes from other cells of the hierarchy which can have various placement orientations with respect to current cell, each collected shape is transformed to reflect its geometric position relative to the placement of the current cell when the overlap occurs. The process can require several different coordinate transformations. For example, when the geometric shape is from a direct sibling cell, both the coordinates of the shape and the current cell can be transformed to the parent cell's coordinates. After the coordinate transformation, the part of the shape that falls into the boundary of the cell is stored as a shape in the VHL. In this way, related shapes are merged and form the VHL, which in turn provides a snapshot of the hierarchical overlapping for the cell.

The embodiment described above generates VHL information for each cell only within its cell boundary. For example, if a geometric shape only abuts one placement of a cell, it will not show up in the VHL for the cell. Since it is important for some DRC algorithms to know the information surrounding the cell, another embodiment of the disclosed methods for shape generation generates VHL shapes for an additional area surrounding the cell boundary. This second embodiment collects shapes in the same way as the previous embodiment, but instead of the original cell boundary, an oversized cell boundary (a virtual boundary) is used for the VHL calculation.

In such embodiments, the VHL is computed from collecting the hierarchical geometric shapes overlapping a cell's virtual boundary, which comprises the cell's merged layer boundaries plus an additional area extending beyond the merged boundaries. In this case the VHL includes the accumulation of the data comprising the overlapping shapes that are pushed into a cell's virtual boundary and then merged into complex geometric shapes. The additional margin by which the cell's merged boundary is extended to create the virtual boundary is referred to as an ambit value and used to create an ambit area. The ambit area is a ring-shaped area extended outside the original cell boundary created by extending the cell boundary by the ambit value. Creating an ambit is also referred to as oversizing the cell. Hierarchical data that overlaps the oversized current cell is pushed into the virtual boundary, with the overlapping data pushed from parent cells and sibling cells into the current cell. Hierarchical data that does not overlap the current cell boundary but does overlap the ambit portion is also pushed into the virtual boundary. As a result, the geometric shapes overlapping the ambit extension area are collected, and along with the shapes overlapping the cell's actual boundary are computed into the complete VHL for the cell. In this way, hierarchical information on potentially interacting shapes for a cell is stored in the VHL, even if the shapes are slightly outside of the cell's boundaries.

Some embodiments also include an apparatus that executes VHL hierarchical algorithms as independent cell-level processes, with the output of one VHL layer being used to generate the input data for the creation of a new layer for another cell. A VHL allows the cell-level processes to accomplish more cell-level data processing in the cell without flattening data out of the cell. The cell-level data processing for each VHL algorithm eliminates the need for reloading data and limits memory consumption, since the entire layer hierarchy is not loaded into memory. In an additional embodiment, a single cell is processed, from start to finish, by an instance of the VHL cell-level process, which allows for significant parallelization and multi-threading across all cells in an IC Design.

The virtual hierarchical layer (VHL) of a cell contains global hierarchical information about the cell, the global hierarchical information representing an accumulation of the overlapping data from the selected cell's parent and sibling cells. Geometric shapes from parents and siblings get pushed into the cell's boundary where they are merged into a set of VHL shapes. The VHL gets generated for all commands in the runset and the commands use the VHL shapes to process the cells in the hierarchy in a bottom-up fashion. The VHL algorithm's performance is heavily dependent on the number and geometric complexity of the VHL shapes. Embodiments described herein provide faster methods of creating the VHL shapes and the generation of simpler geometrical shapes for the VHL.

A virtual cell model can be generated using the VHL data. Embodiments of the virtual cell model involve providing the model data, which is a compressed representation of the unsolved geometric data for each cell in the hierarchy, and propagating the model data to the cell's parent through model channels. As the DRC algorithms process through the IC design's hierarchy to process the input data layer cell by cell, the virtual cell model can be generated for each cell, and the original data of the cell can be released from memory. Then, in the parent cell, the geometric information can be extracted from the virtual cell models to resolve geometric operations that were undetermined in the child cells. The virtual cell model concept addresses the memory bloat created by loading a large number of design cells. The disclosed concepts provide the ability to load only one cell at a time, promote geometric processing using cell-level algorithms, and produce a compressed representation of a cell which can later be used by parent cells at a higher level in the hierarchy. After the virtual cell model is created for a cell, memory can be freed, which greatly reduces the memory usage for hierarchical geometric algorithms.

A DRC algorithm using the virtual cell model first generates the model data for various channels in each cell. To generate model data representing unsolved geometric operations in a cell, it can first decide whether the results of the cell-level operations are true or potentially false. The cell-level results can be inaccurate, or false/fake, for the reason that there can be geometric shapes from other cells (e.g. ancestors or siblings of the current cell) of the hierarchy overlapping one or more placements of the current cell which can change the results. The overlapping information from the non-descendant cells can also be used by the DRC algorithms. VHL shapes from the virtual hierarchical layer represent one way to acquire such information. The current cell can also generate undetermined results from overlapping data from its parent or sibling cells. After the cell-level results are computed when building the virtual cell model of the current cell, the model data from the current cell's child cells can also be examined. If the model data is still needed by the current cell's parent cells, the model data can be passed up one more level as a part of the current cell's virtual cell model.

Polygons contained within the parent cell and/or a sibling cell can interact with the cell. If the interacting polygons are from outside of the cell, the cell-level geometric operation cannot be resolved within the cell. The polygons, or shapes, which can interact with the cell can be in any hierarchical level of the semiconductor design. The interactions can be between the other shapes and shapes within the cell. The other shapes can include rectangles, rhombi, complex polygons, and so on. In some embodiments, the virtual cell model is generated using geometric processing with cell-level algorithms. Geometric processing includes geometric operations such as, but not limited to, union/merging, intersection, area calculation, length calculation, and Boolean operations. The cell-level algorithms can include DRC algorithms, DRM algorithms, and so on. The DRC and DRM algorithms can be part of a runset. The cell-level algorithms can result in a compressed representation of the cell, where the compressed representation can be used by parent cells and other cells which are contained within a higher level in the design hierarchy. The model data can be generated as a result of an unresolved geometric operation. An unresolved geometric operation can be passed to a parent cell for possible resolution. The cell-level data can be changed in the parent cells, and then the cell-level results can also be changed or invalidated in the parent cells. So, the hierarchical overlapping information can be used in the model data generation. Some embodiments of the virtual cell model generation utilize the virtual hierarchical layer, but other embodiments can utilize other methods of finding the overlapping polygons.

After the different types of model data are generated, the memory storing the original cell-level data layer can be released. As the model data uses much less memory than the complete original data layer, but still carries all the geometric information needed by the parent cell, the releasing of the data layer can result in the freeing of a significant amount of memory. The model channels are responsible for delivering the model data to the parent cell. The model channels can deliver the model data to all placements of the child cell in its parent cell, and translate the coordinates of the model data into the parent cell's coordinates.

To use virtual cell models, DRC algorithms can be developed with the knowledge of the types of virtual cell model channels used by specific virtual cell models. As model data is delivered from child cells to the parent cells, the DRC algorithms are responsible for interpreting the various model channels from the child cells. When in a cell, relevant geometric information of cells below the cell can be extracted from the model data. In other words, the use of the virtual cell model allows the DRC algorithms to access accurate geometric information from multiple levels of hierarchy below the current cell being processed. Combined with the parent cell's own cell-level data, the DRC algorithms can resolve undetermined results from the child cells. Also, the model data prevents the parent cell's cell-level processing algorithms from generating false results, due to lack of irrelevant geometric information from its child cells.

From the perspective of memory usage, the virtual cell model has the advantage of loading much less data than the original data layer for the processing of each cell, because it only contains the unresolved data. Furthermore, for a bottom-up DRC algorithm, the data from a specific virtual cell model can be released after all its parent cells have been processed, thus reducing memory usage as the algorithm progresses up the IC design hierarchy. As noted, this method reduces the current hierarchical DRC issue of performance tradeoffs between memory consumption and data I/O time.

A DRC algorithm that uses a VHL can take in pre-generated VHL shapes together with the input data layers and perform cell-level geometric operations. The creation of the VHL can be a separate process that occurs before the DRC algorithms begin cycling through the design. Existing DRC tools acquire hierarchical information as the DRC algorithms are cycling on the hierarchical geometric shapes; thus the collected information in the VHL can be fed in to existing DRC tools. A VHL can be independent from any particular DRC algorithm; one VHL is typically not locked to a specific DRC algorithm. For example, if two DRC algorithms are performed on the same input data layers, they can share the same VHL. The sharing and reuse of the VHL can provide efficiency and flexibility in the implementation of DRC algorithms.

However, the disclosed concept of virtual hierarchical layer propagation takes a predefined VHL as the input to a DRC algorithm and propagates a new VHL and the algorithm's result to the next DRC algorithm. This re-propagation removes an algorithm's dependence on pre-generated VHL and replaces it with an internal generation process for each DRC algorithm. Each unique algorithm processes geometric shapes input into the VHL in combination with cell-level data to calculate the new VHL, which is then propagated to the next DRC algorithm. This process both reduces the overhead of pre-generating VHL shapes and improves the overall runtime of the physical verification tool.

In virtual hierarchical layer propagation, the VHL propagation algorithm is combined with the VHL-based command algorithm in order to produce a verification result in a single-pass, bottom-up hierarchical process. The VHL algorithm is enhanced to generate both the output layer and the output layer's VHL simultaneously. Each command varies slightly in the command specific VHL propagation algorithm used, but any potential results generated in the parent cell are part of the output VHL of the child cell. The potential results in the parent cell overlap the current cell and thus by definition are part of the current cell's VHL.

The design is processed hierarchically from the bottom to the top of the hierarchy, with each cell calculating its output VHL based on its input VHL and the virtual cell model. If a VHL is generated using the methods outlined herein, the input VHL of a cell contains overlapping data from both the parent cells and the sibling cells. The main data channel of the virtual cell model contains the undetermined results that, in embodiments, can be resolved in the parent cell—i.e. potential results in the parent cell. Since the potential results overlap the current cell, they are part of the output VHL for the cell. Many input VHL shapes can be filtered out if the VHL algorithm decides that the VHL shapes are not part of the result in the parent or in the sibling cells. The remaining VHL shapes, the shapes that the algorithm cannot conclusively determine to be part of the cell-level results, are propagated to the output VHL.

An embodiment of the present concept relates to propagation of VHL through a chain of DRC commands where the output layer of a previous command is also the input layer of the next command. That is, instead of pre-generating a VHL for each command's input layers, one command propagates its input VHL to its output VHL and feeds the VHL into the next command in the chain. Since the propagation process is faster than the pre-generation process, the overall runtime is improved.

Further Details

FIG. 1 is a flow diagram for virtual hierarchical layer propagation. The flow diagram 100 describes a computer-implemented method for design analysis. The flow 100 includes obtaining a semiconductor design 110 including a plurality of cells and a plurality of hierarchical design levels. The cells can be any of a variety of cells appropriate to the semiconductor design. The cells can include analog cells, logic cells, routing cells, memory cells, etc. The cells can be individual cells, can be repeated within a given logic cell, can be repeated throughout the semiconductor design, and so on. The design can include hierarchical design levels, where the hierarchical design levels can include structural levels, logical levels, abstract levels, and so on. The hierarchical abstraction levels can also include behavioral levels, register transfer levels (RTL), circuit levels, physical design levels, and the like. The semiconductor design can be obtained from a design library stored in any appropriate computer-readable formats. The design can be obtained by reading computer files, generating the design from RTL code, reading input from a user, and so on.

The flow 100 includes identifying a cell and multiple instances of the cell 120 within a semiconductor design that includes a plurality of cells and a plurality of hierarchical design levels where the cell and the multiple instances of the cell comprise the plurality of cells. The cell which is identified can be any cell appropriate to the semiconductor design. For example, the cell can be an analog cell, a logic cell, a memory cell, and so on. The cell can be a single cell or an instance of repeated cells. The cell can be contained within a design hierarchy, where the design hierarchy can be logical, structural, architectural, abstract, or any other appropriate design hierarchy. The instances of the identified call can appear throughout the hierarchical design levels. The instances of the cell can be translated from the identified cell as needed. For example, the instances of the cell can be rotated, mirrored, scaled, and so on, with respect to the identified cell. The cell and the instances of the cell can be identified for a variety of purposes including design rules for manufacturing (DRM), design rule checking (DRC), design analysis, logic simulation, design verification, design validation, or any other purpose.

The flow 100 includes generating virtual hierarchical layer (VHL) shapes, based on the polygons which overlap the cell, in response to an algorithm operation 130. The polygons can be rectangles, rhombi, complex polygons, or any other type of polygon. The generating of the VHL can include using an input VHL and a virtual cell model. The generating of the VHL can be based on commands in the runset. In some cases, the VHL shapes include geometric shapes not contained by the cell. The geometric shapes can be polygons or portions of polygons. The geometric shapes can be contained in other levels of the design hierarchy. In some embodiments, the VHL shapes include accumulated overlapping polygon information. The accumulated overlapping polygon information can be obtained from the polygons overlapping the plurality of instances of the cell which was identified, for example. In embodiments, the overlapping polygon information includes shapes from parent and sibling cells. The overlapping polygons from the parent and sibling cells of the identified cell might not be resolved in the cell and can be pushed into the VHL.

The flow 100 includes propagating the VHL shapes to a subsequent algorithm operation 140. The sequence of algorithm operations can represent DRC, DRM, and so on. In some embodiments, the algorithm operation and the subsequent algorithm operation are part of a design rule checking (DRC) process. VHL shapes can be propagated from one algorithm to the subsequent algorithm based on how the algorithm operates upon the VHL shapes. The propagation of VHL shapes can eliminate a pre-generation step to create a VHL for a given algorithm. The propagation can take advantage of relationships between an input VHL and an output VHL. The output VHL can be generated at the same time the output results of the algorithm are being determined. Reusing and propagating an input VHL can reduce the total number of VHL generation operations.

In one embodiment, the algorithm operation and the subsequent algorithm operation comprise a runset. The runset can include a sequence of commands to perform DRC, DRM, and other operations. The runset can include a series of algorithms including complex algorithms. The complex algorithms can loop through the hierarchical levels of the design to produce hierarchical results which can be passed along to additional runset commands.

The flow 100 further comprises updating the VHL shapes in response to the subsequent algorithm operation 142. The algorithm can be one of a DRC algorithm, a geometric algorithm, a runset command, and the like. The updating of the VHL shapes can result from the subsequent algorithm operating on an input VHL or a propagated VHL. The flow 100 further comprises performing a coordinate transformation 144, as part of the updating of the VHL shapes, in order to put the VHL shapes onto common coordinates. The algorithm can update the VHL shapes based on rotation, translation, mirroring, or scaling of a cell, for example. The coordinate transformation can enable simpler analysis of overlapping polygons of the cell and the instance of the cell. For example, in the flow 100 the performing the coordinate transformation comprises computing a mirror image of the VHL shapes 146. The computing of a mirror image can prove useful in electronic designs that include an instance of the cell that is a mirror image of the cell. By reversing the orientation of the cell, an analysis of polygons overlapping the cell and the instance of the cell can be performed. In the flow 100, the performing the coordinate transformation comprises computing a rotation of the VHL shapes 148. For example, some electronic designs include an instance of the cell that is a rotated version of the cell. By rotating the orientation of the cell, an analysis of polygons overlapping the cell and the instance of the cell can be performed.

The flow 100 further comprises filtering out shapes 150 that will not be included as part of the updating of the VHL shapes. An algorithm operating on a propagated VHL, for example, can determine that a shape should not be included in the updated VHL. The determined shape can be filtered out and not included among the updated shapes of the VHL. In some embodiments, the filtering is based on combined processing of cell-level data shapes and the VHL shapes 152. Some example commands include area, span, select, interaction with other layers, and so on. The processing of the cell-level data shapes can be based on an algorithm. The processing algorithm can determine that the cell-level shapes can be resolved within the cell and thus can be filtered out of the VHL. The processing of the cell-level data shapes with the VHL shapes can include creating additional VHL shapes 154 based on unresolved cell-level operations in some embodiments of the flow 100. The creating of additional shapes can be based on an algorithm. The creating of additional shapes can include simplifying the VHL shapes by adding additional shapes.

The flow 100 further comprises propagating the VHL shapes through a chain of operations 160. The chain of operations can include a plurality of operations, and can include the algorithm operation and the subsequent algorithm operation. The chain of operations can represent a DRC operation or a DRM operation, or a design analysis, verification or validation operation, for example. The output VHL from a command in the chain of operations can be propagated to the input VHL of a subsequent command. The command can then be propagated from the input VHL to the output VHL, and subsequently fed into the input VHL of the next command, continuing the chain. The chaining of the DRC commands can eliminate the VHL pre-generation process. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
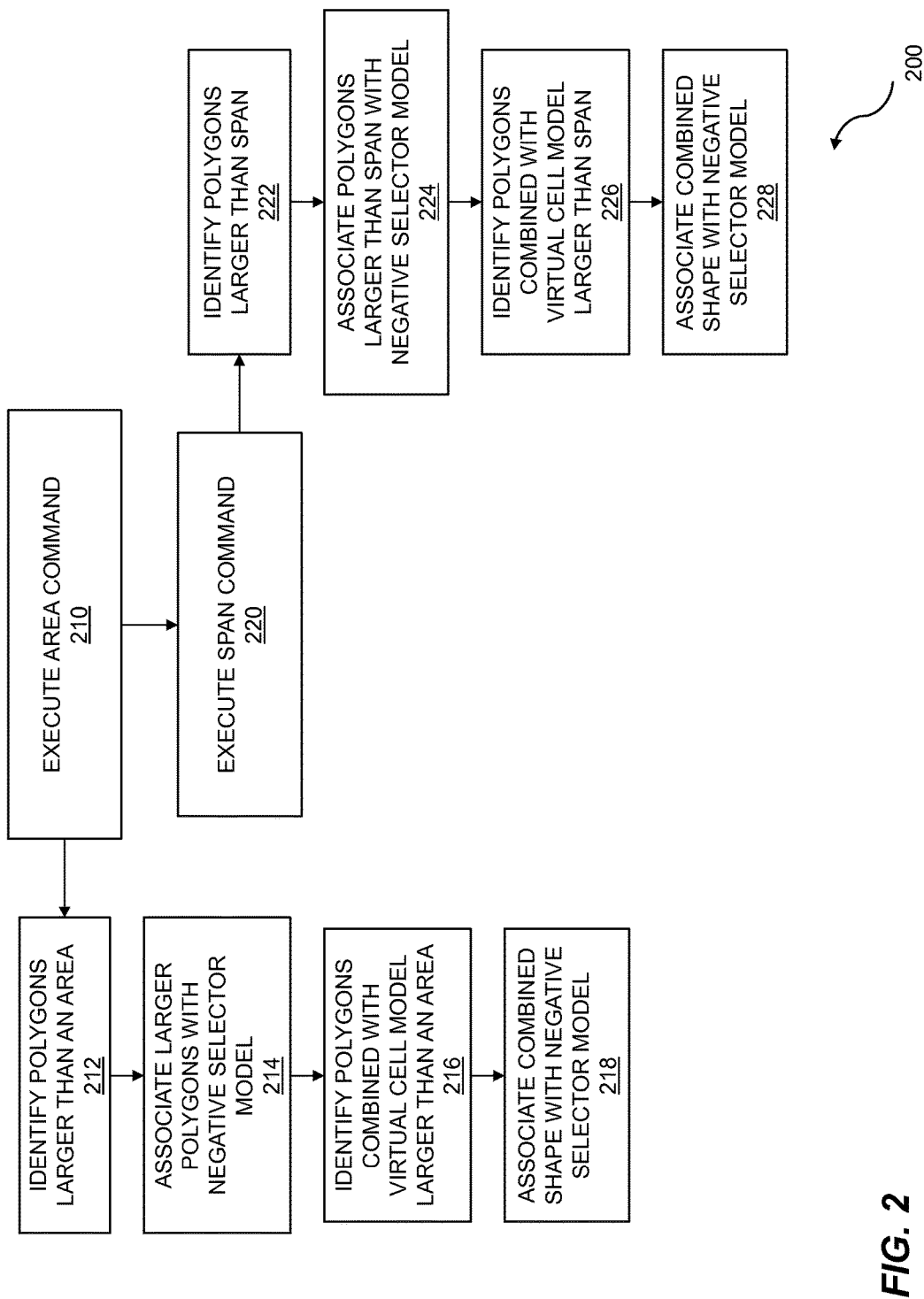
FIG. 2 is a flow diagram for shape filtering.

FIG. 2 is a flow diagram 200 for shape filtering. The flow 200 shows filtering out VHL shapes using a variety of techniques. In some embodiments, the flow 200 includes executing an area command 210. The flow 200 can include identifying one or more polygons that are larger than a certain area 212 specified by the area command. The flow 200 can also include associating the one or more polygons that are larger than the area specified by the area command with a negative selector model 214. The flow 200 can include identifying one or more polygons that, when combined with a virtual cell model from the cell to form a combined shape, result in a combined shape area that is larger than the area 216 specified by the area command. The flow 200 can also include associating the combined shape with a negative selector model 218.

In some embodiments, the flow 200 includes executing a span command 220. The flow 200 can include identifying one or more polygons that, when combined, are larger than a span area 222 specified by the span command. The flow 200 can also include associating the one or more polygons that are larger than the area specified by the span command with a negative selector model 224. The flow 200 can include identifying one or more polygons that, when combined with a virtual cell model from the cell to form a combined shape, result in an area of the combined shape that is larger than a span area 226 specified by the span command. The flow 200 can also include associating the combined shape with a negative selector model 228.

Some embodiments use a virtual cell model that can include one or more model channels where different types of information are sent from a cell to its parent cell. One type of a model channel is a selector model channel. With a selector model channel, selector data is sent to the parent cell, and can be used as a positive selector to tell the parent cell that data overlapping with the positive selector data represents a potential positive (i.e. a true result) for the particular command. So, for example, if some geometric shape in the child cell can be determined to be a true result for the area command, then any shape interacting with it in the parent cell is also a true result. Conversely, data sent as a negative selector tells the parent that the data overlapping with the negative selector data can be found to be false for the particular command.

Figure 3:
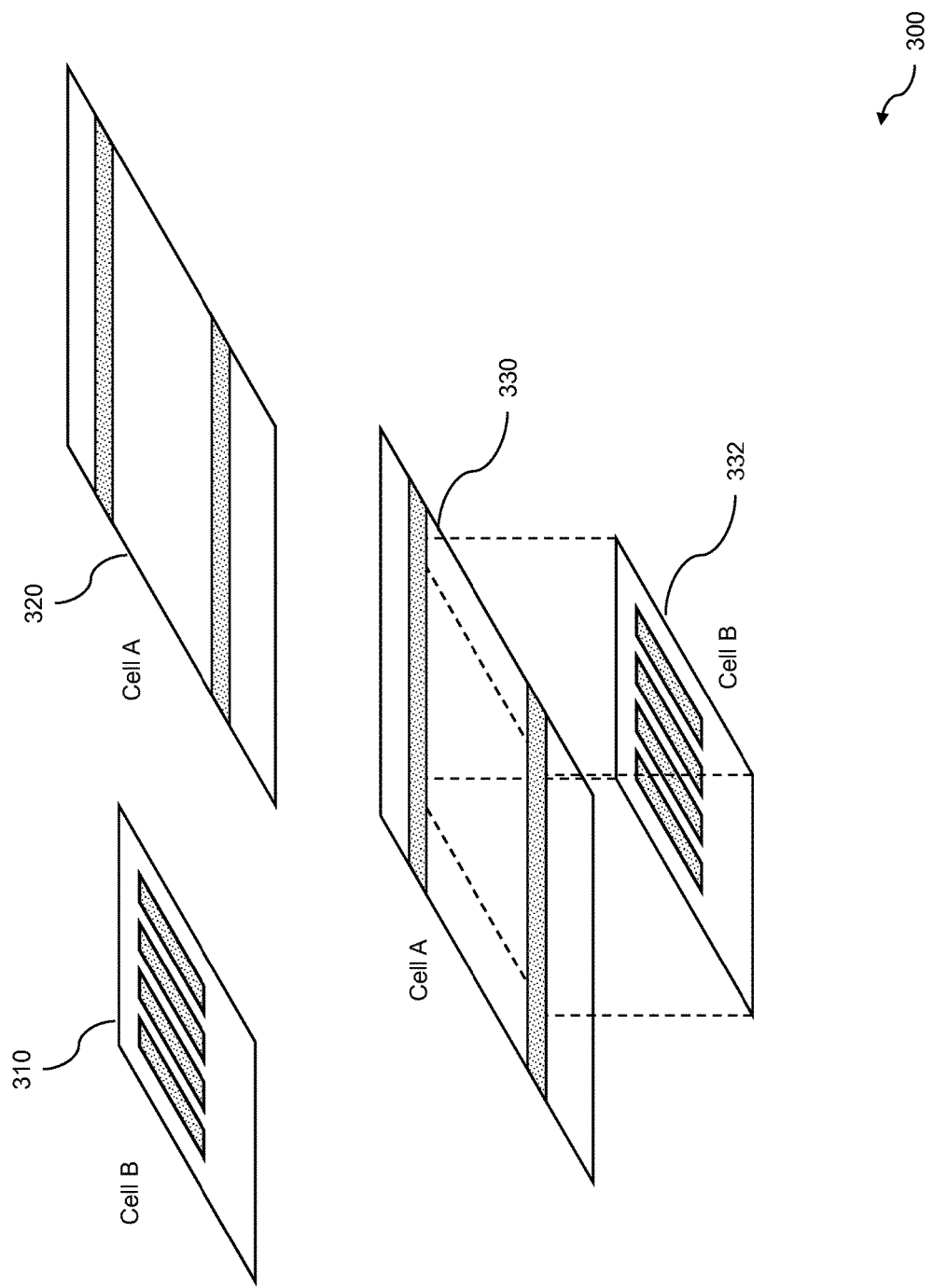
FIG. 3 is an example cell level layout and hierarchical layout.

FIG. 3 is an example cell level layout and hierarchical layout. The design 300 includes cell-level layouts of cell B 310 and cell A 320. In one portion of the design 300, an instantiation 330 of cell A includes an instantiation 332 of cell B, so that the instantiation 330 of cell A is the parent cell of the instantiation 332 of cell B in the hierarchical layout of the design 300.

Figure 4:
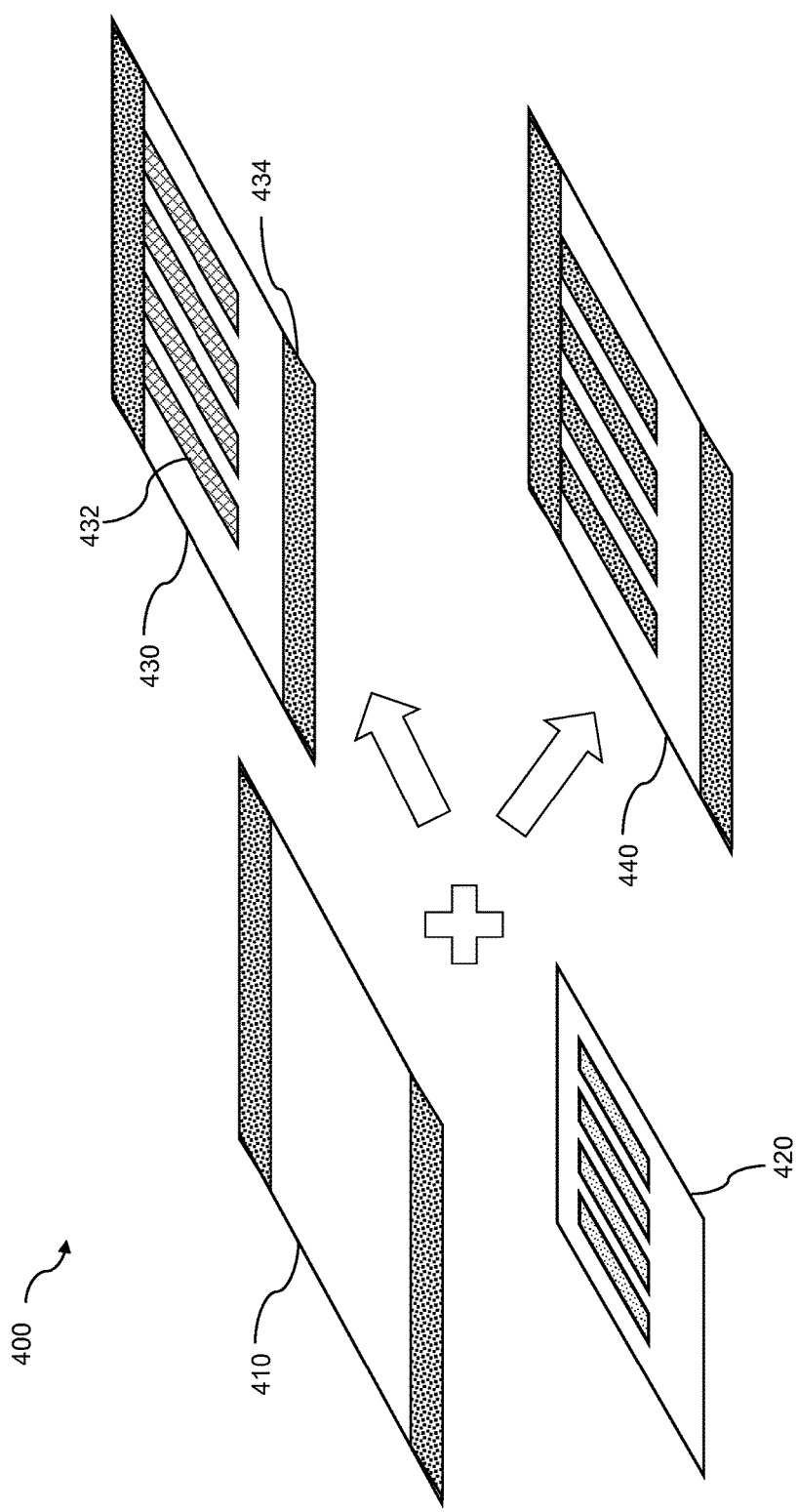
FIG. 4 is an example of cell input VHL propagated to virtual cell model data and output VHL.

FIG. 4 is an example of cell input VHL propagated to virtual cell model data and output VHL. The drawing 400 shows the cell input VHL data 410 for cell B 310 and the local data 420 for cell B 310. The input VHL data 410 represents the overlapping data from cell B's 310 parent cell, cell A 320. The cell input VHL data 410 is combined with the cell's local data 420 to create the virtual cell model data 430. The virtual cell model data 430 can then be passed to a parent cell. Depending on the embodiment, the virtual cell model data 430 can be passed through a plurality of channels. In at least one embodiment, the local cell data, including the polygon 432, is passed through one channel, and the input VHL data, including another polygon 434, is passed through a different channel. For example, if the command being executed is a level command, where any cell-level data interacting with any hierarchical data is moved up to a common point in the hierarchy using a model channel, the local data can be passed through a main model channel, and the input VHL data passed through a different channel. The cell input VHL data 410 can also be combined with the cell's local data 420 to create the output VHL 440 for cell B 310. In some embodiments, the virtual cell model data 430 is used to create the output VHL 440. But in both cases, the input VHL 410 is propagated, directly or indirectly, to the output VHL 440 because the input VHL shapes indicate potential results in the parent cell.

Figure 5:
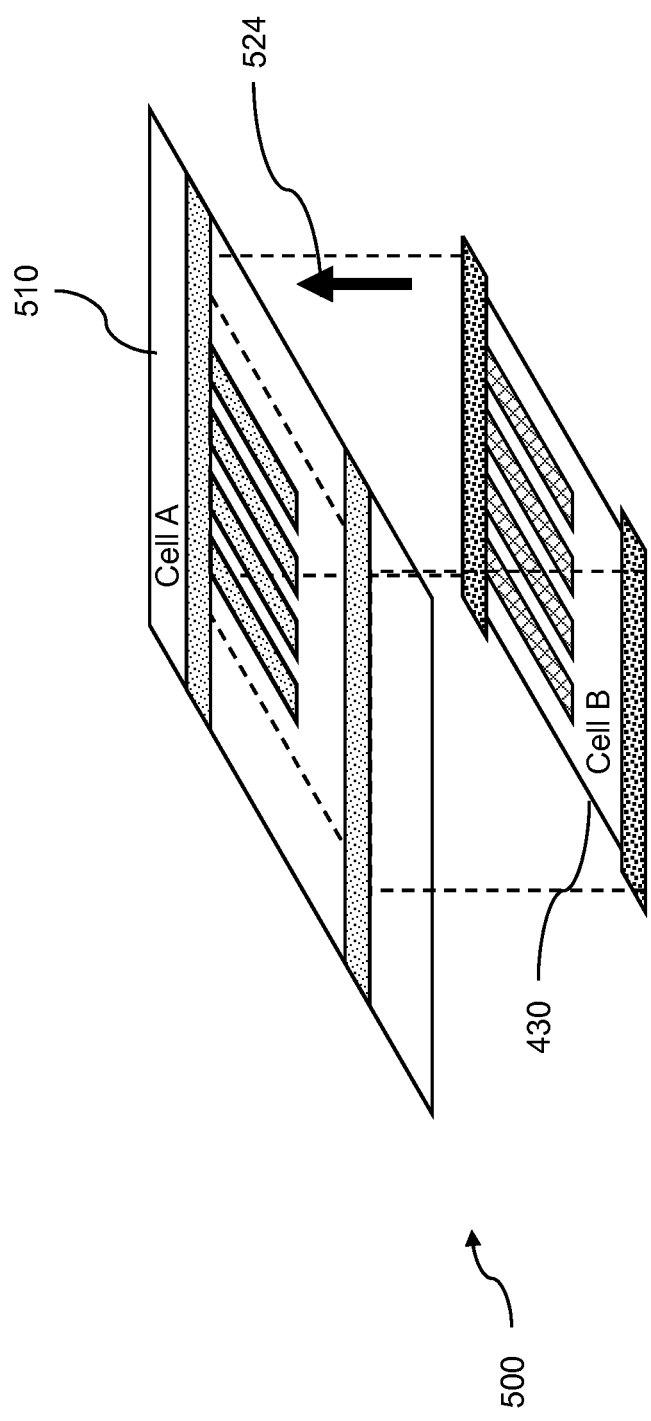
FIG. 5 is an example of command output data.

FIG. 5 is an example of command output data. The drawing 500 illustrates the final result 510 of the level command for cell A 330. The virtual cell model data 430 is provided 524 to the parent cell A as a part of executing the level command. As a consequence, the final result 510 can be computed in the parent cell A. In at least some embodiments, the virtual cell model data 430 is then used as the output VHL data for a subsequent command. In some embodiments, the virtual cell model data 430 is filtered to create the output VHL data.

Figure 6:
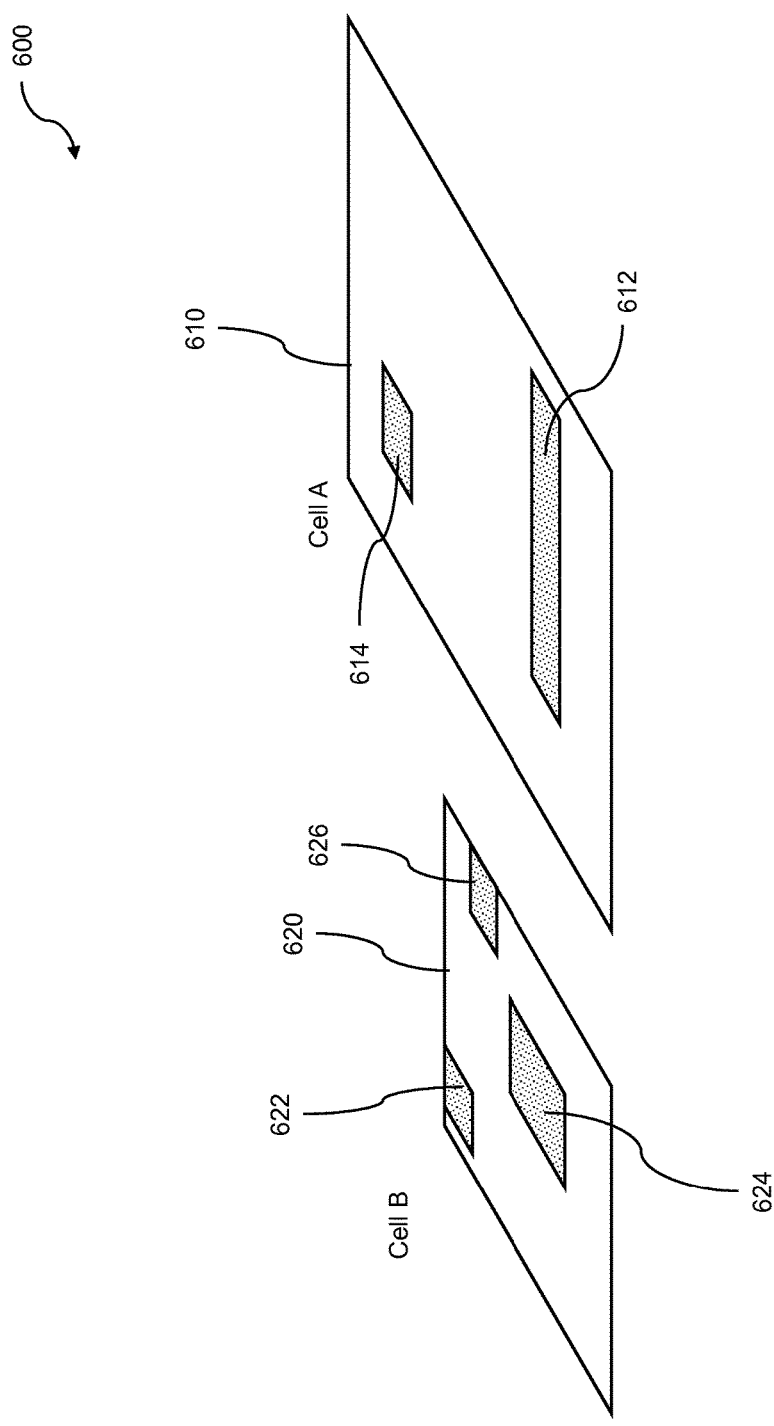
FIG. 6 is an example cell-level layout.
Figure 7:
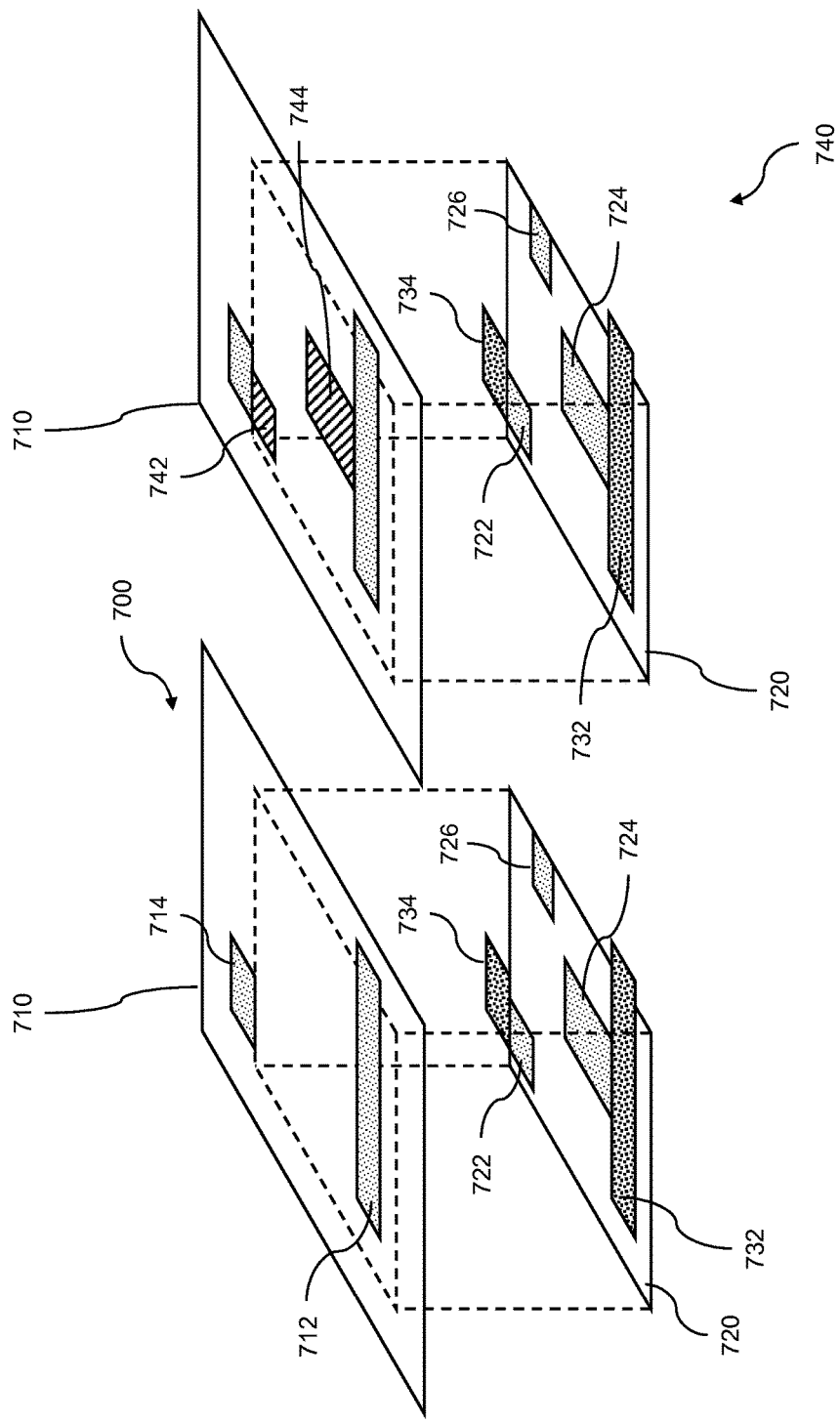
FIG. 7 is an example hierarchical layout and model data from child cell to parent cell.
Figure 8:
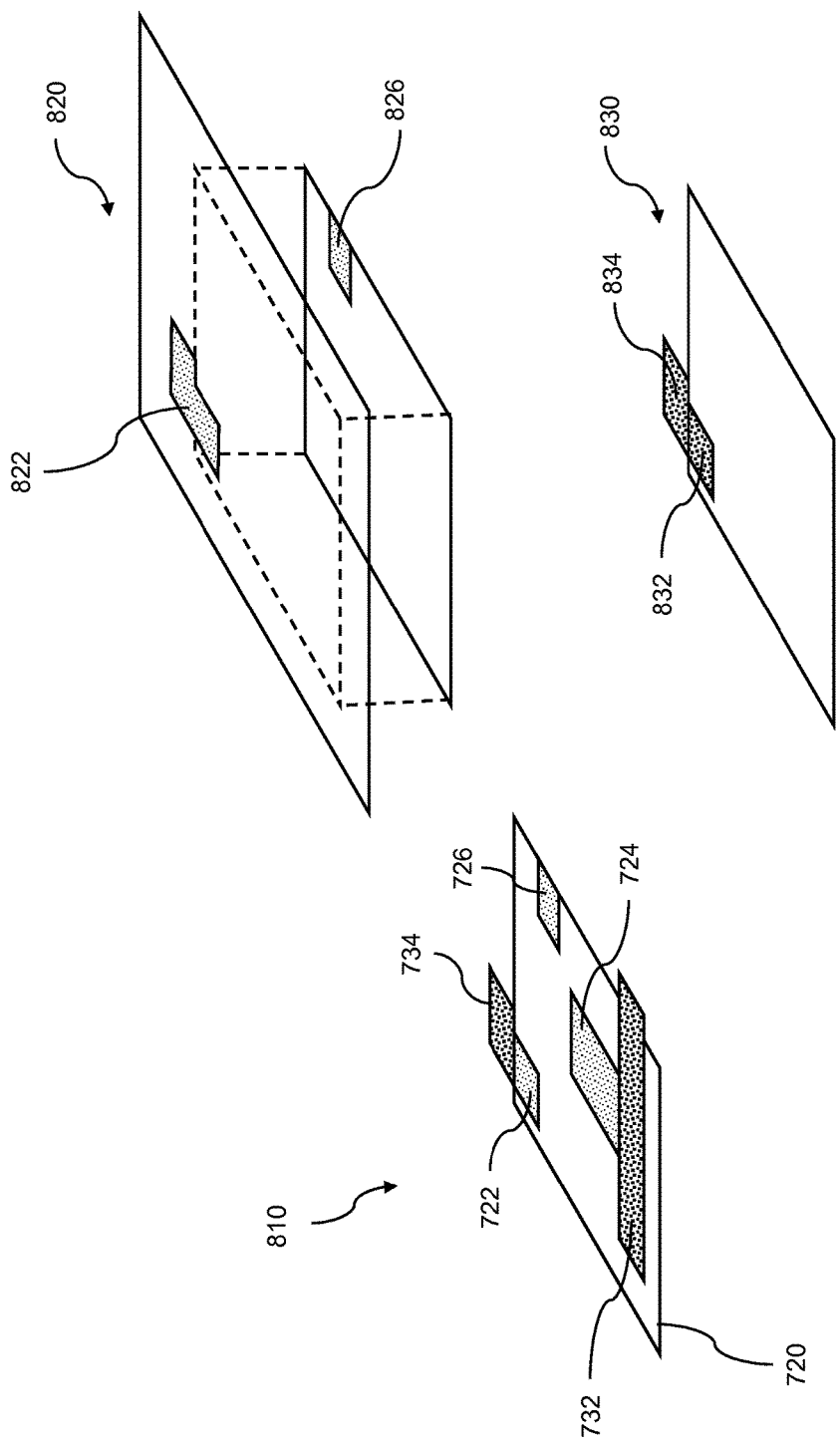
FIG. 8 is an example command result and final propagated VHL.

FIGS. 6-8 show an example of filtering input VHL in the context of an area (<N) command. The area (<N) command selects whole polygons that have areas smaller than a specified value N. The input VHL of a cell contains overlapping data from the parent and the sibling cells. Input VHL shapes can be filtered out if the VHL algorithm decides that these VHL shapes will not be part of the result in the parent or in the sibling cells. Any remaining VHL shapes that cannot be definitively determined to be part of the results can then be propagated to the output VHL. The main data channel of the virtual cell model contains the undetermined results that can be potentially resolved in the parent cell and are thus potential results in the parent cell. Since these potential results overlap the current cell, they are part of the output VHL for the cell.

FIG. 6 is an example cell-level layout. Cell A 610 includes a first polygon 612 and a second polygon 614. Cell B 620 includes a first polygon 622, a second polygon 624, and a third polygon 626. These type cells and polygons can be manipulated as part of the VHL process with VHL shapes being propagated to subsequent algorithm operations.

FIG. 7 is an example hierarchical layout and model data from a child cell to a parent cell. The design 700 includes an instantiation 710 of cell A that in turn includes an instantiation 720 of cell B, as well as a first polygon 712 and a second polygon 714. VHL data from cell A includes shapes, based on the first polygon 712 and the second polygon 714 that overlap the instantiation 720 of cell B. The input VHL data for cell B includes a first shape 732, based on the first polygon 712 of the instantiation 710 of cell A, which overlaps the boundary of the instantiation 720 of cell B. In some embodiments, generating virtual hierarchical layer (VHL) shapes, based on polygons which overlap the cell, comprises expanding a boundary of the cell by an ambit value so that shapes near the merged border of a given cell instantiation can be used in the VHL generation. The input VHL data for cell B includes a second shape 734, based on the second polygon 714 of the instantiation 710 of cell A, which overlaps the boundary of the instantiation 720 of cell B after it is expanded by an ambit value.

The drawing 740 illustrates virtual cell model data sent from the child cell 720 to the parent cell 710 for the area (<N) command. In this case, the first polygon 722 of cell B has an area that is smaller than the specified value. But, because the first polygon 722 abuts the second VHL shape 734, a combined polygon in the parent cell can be determined to be larger than the specified area value, rendering it not fully resolvable within the cell. Therefore, the combined polygon is sent to the parent cell 710 as main model data 742 comprising part of cell B's virtual cell model in order to be resolved in the parent cell. The second polygon 724 has an area that is already bigger than the specified area value. Because the second polygon 724 abuts or overlaps the first VHL shape 732, the combined shape is by definition larger than the specified area value. Therefore, the combined shape is sent to the parent cell 710 as a part of cell B's virtual cell model data as a negative selector model 744 so any shapes that overlap or abut the negative selector model data 744 in the parent or sibling cells are not selected either. The third polygon 726 has an area that is smaller than the specified area value and does not overlap any VHL data, so it can be resolved as selected for the area (<N) command within the cell.

FIG. 8 is an example command result and final propagated VHL. The virtual cell model data 810 for the child cell 720 includes the input VHL data 732 and 734, and the local data 722, 724, and 726. The command result 820 for the area (<N) command includes the combined polygon 822 which results from the union of the first polygon 722 from the child cell 720 and the second polygon 714 from the parent cell 710, which is still smaller than the specified area value. The command result 820 for the area (<N) command includes the polygon 826 which is based on the third polygon 726 of the child cell 720 which was evaluated within the child cell 720 and determined for selection.

The final propagated VHL 830 includes a first shape 832 based on the first polygon 722 from the local data of the child cell 720, and a second shape 834 based on the second polygon 734 of the input VHL data. The output VHL can include shapes that are propagated from the input VHL, such as the second shape 834 propagated from the input VHL shape 734. The output VHL can include shapes that cannot be fully evaluated for the command within the cell. So in some embodiments, the generating VHL shapes, based on polygons which overlap the cell, further includes identifying undetermined results from the cell. Note that the first VHL shape 732 can be filtered out from the propagated VHL since it is not going to be selected in the parent cell; it was a part of the negative selector model channel data. Thus, some embodiments include generating an output VHL from an input VHL, wherein the output VHL comprises fewer polygons than the input VHL.

Figure 9:
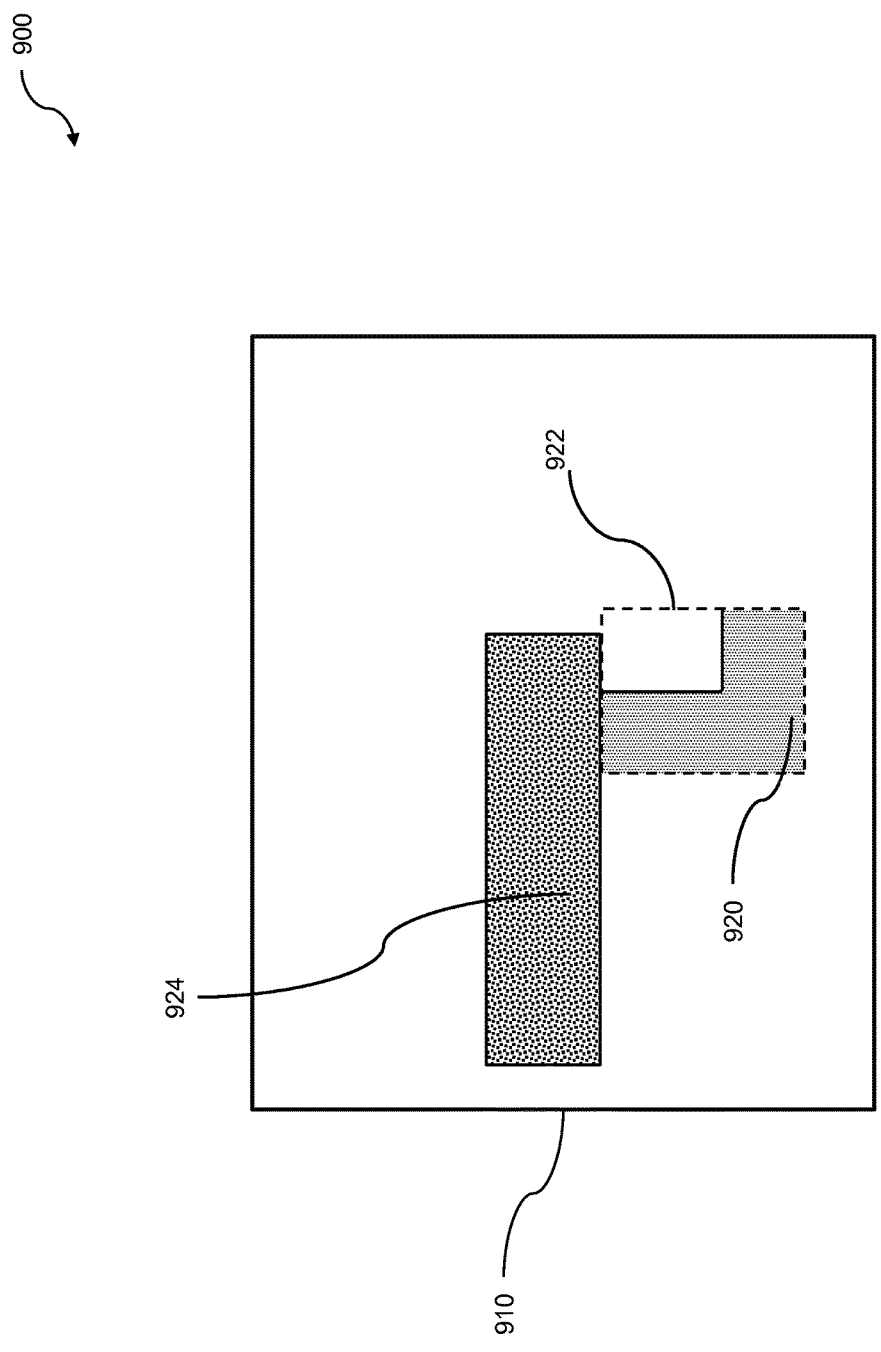
FIG. 9 illustrates a span command that can be utilized with complex polygons.

FIG. 9 illustrates a span command that can be utilized with complex polygons. Whereas the area command previously described computes the area of the polygon itself, the span command computes the area of a rectangular bounding box that circumscribes the polygon. As can be seen in the drawing 900, a cell 910 includes a complex polygon 920 that abuts a propagated shape 924. The span command considers the area of the rectangular bounding box 922, which is referred to as the span area rather than the area of the polygon 920. Thus, a span (<N) command performs filtering based on polygon shapes having a span area less than a predetermined value.

In embodiments, the VHL is the union of all the hierarchical interactions. It is acceptable to simplify certain operations as long as the resultant operation is conservative and covers any potential hierarchical interactions. The propagated VHL can be more conservative compared to the pre-generated VHL since the propagated VHL is generated in a bottom-up fashion with uncertain knowledge of the parent data. In some embodiments, generating extra VHL shapes is done to achieve faster VHL generation. The tradeoff usually favors the faster run time of the VHL propagation, since the conservative VHL only has a minor impact on performance for the subsequent VHL commands, especially for the single layer commands.

Figure 10:
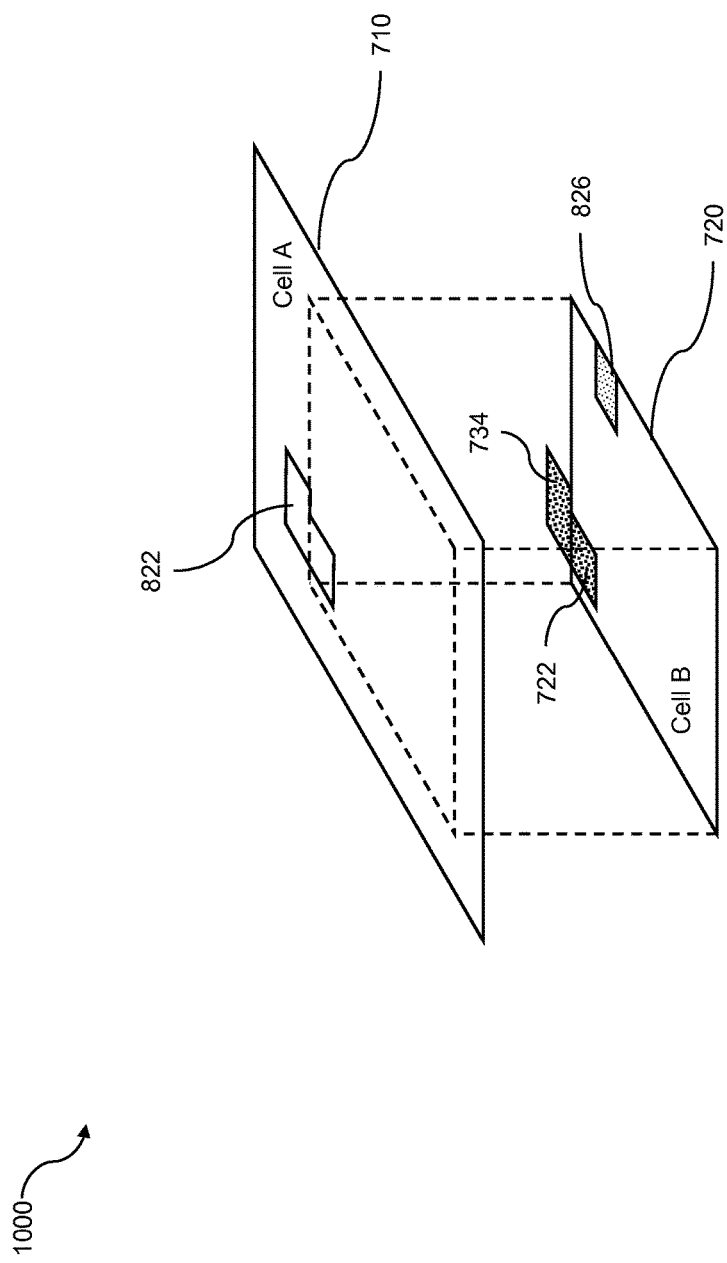
FIG. 10 is an example conservative VHL in a child cell without a corresponding output shape in a parent cell.

FIG. 10 is an example of a conservative VHL in a child cell without a corresponding output shape in a parent cell. The area (<N) command selects polygons that have an area smaller than the specified value N. The same example is used in the drawing 1000 as is shown in FIGS. 6-8. Because the area of the first local data polygon 722 is smaller than the specified area, and it overlaps/abuts the second VHL shape 734, the area of the final resultant polygon can't be determined within cell B 720. The first local data polygon 722 is part of cell B's virtual cell model. The combined shape 822 based on the union of the first local data polygon 722 and the second VHL shape 734 is propagated to the parent cell A 710 as the output VHL shape of the child cell B 720. Because the second VHL shape 734 is based on data pushed from the parent cell A 710, the portion of the combined shape 822 generated from the local data of cell A 710 is redundant, and the combined shape 822 is larger than would actually be necessary, i.e. the combined shape 822 is a conservative shape. However, as long as the conservative VHL shape does not overlap with any of cell B's output data 826, its impact usually is benign for the next command.

Figure 11:
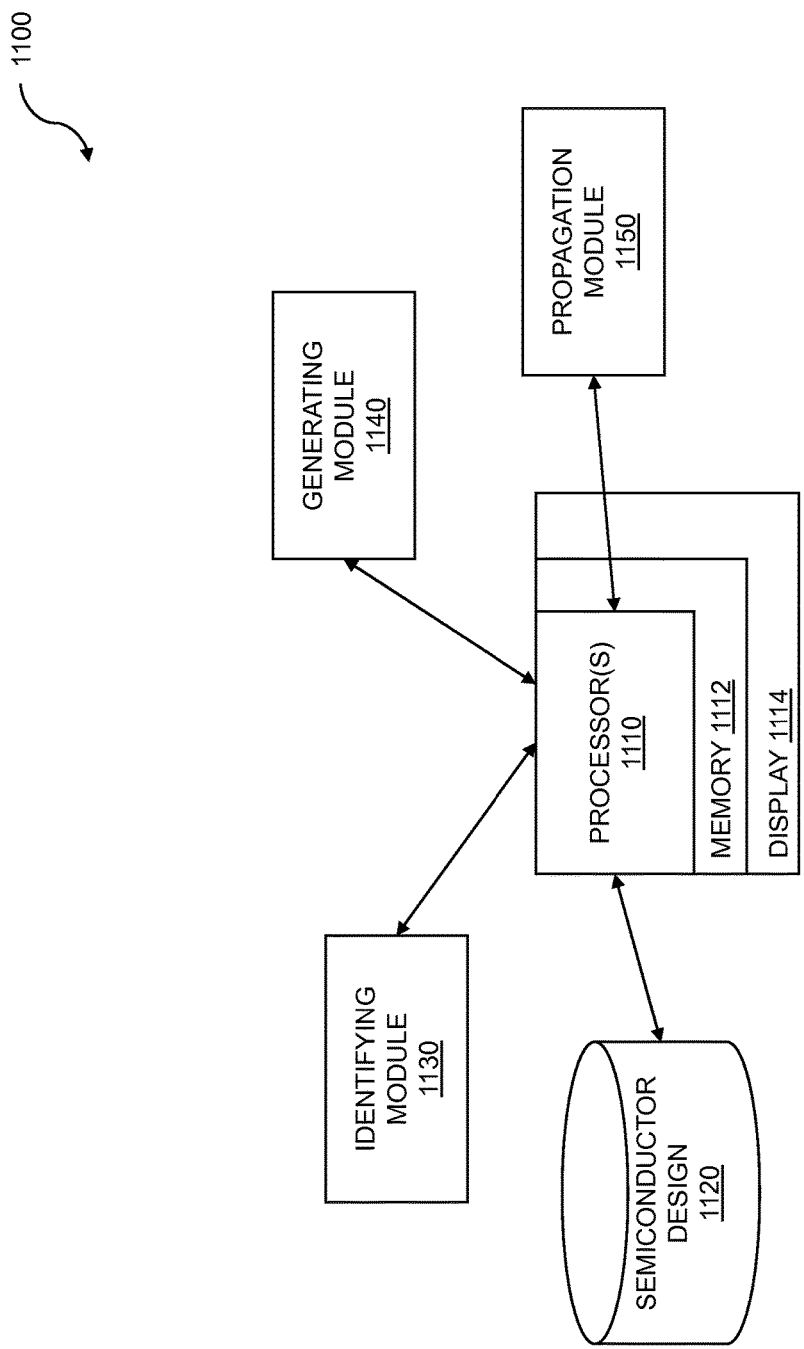
FIG. 11 is a system diagram for virtual hierarchical layer propagation.

FIG. 11 is a system diagram for virtual hierarchical layer propagation. The system 1100 can include one or more processors 1110 which are coupled to a memory 1112. The memory 1112 can be used to temporarily or permanently store instructions, such as computer code, as well as calculated, temporary, partial, intermediate, and/or permanent computer data. The data can include any appropriate type of data including data for one or more semiconductor designs. The semiconductor design data can include cell information; hierarchical level information; layout information; layer information; mask information; optical information; design, configuration, and test data; test instructions; and so on. The data can include and describe various design levels. The data can include other types of data such as system support information, analysis results, and the like. The data can also include VHL data and/or virtual cell model data. A display 1114 can also be present. The display can be any of a variety of electronic displays and screens, for example, and can include a computer display or screen, a laptop computer screen, a tablet screen, a smartphone display, a personal digital assistant (PDA) display, a handheld display, a remote display, a projector, a television, and so on.

The system 1100 also includes a semiconductor design 1120. The semiconductor design 1120 can include a plurality of design levels. The semiconductor design 1120 can be stored in any appropriate storage device and medium including a hard disk drive (HDD), a solid-state drive (SSD), an optical disk drive (ODD), or another computer-readable storage medium. The semiconductor design 1120 can include descriptions of levels, hierarchies of levels, virtual hierarchical levels, descriptions of rectangles and polygons, and so on. The system 1100 includes an identifying module 1130. The identifying module 1130 can be used to identify a cell and multiple instances of the cell within a semiconductor design 1120 that includes a plurality of cells and a plurality of hierarchical design levels where the cell and the multiple instances of the cell comprise the plurality of cells. The identified cell can be any of a variety of cells including analog cells, logic cells, storage cells, processing cells, interconnection cells, and so on. The cell can be a parent cell, a child cell contained within a parent cell, a sibling cell to a cell contained within the parent cell, and so on. The system 1100 also includes a generating module 1140. The generating module can be used to generate virtual hierarchical layer (VHL) shapes, based on polygons which overlap the cell, in response to an algorithm operation. The polygons which overlap the cell can be included in the parent cell, in hierarchical levels which interact with the cell, in another instance of the cell, and so on. The algorithm operations can include any operations appropriate to the analysis of the cell. The algorithm operations can be based on a runset. The algorithm operations can be geometric algorithms to implement a given DRC command, for example. The system 1100 also includes a propagation module 1150. The propagation module 1150 can propagate the VHL shapes to a subsequent algorithm operation. The propagated VHL shapes can include shapes from a VHL that is output by an algorithm. The VHL shapes can include those shapes within the cell which cannot be resolved within the cell, for example. The propagating can include propagating the VHL shapes through a chain of operations. The chain of operations can include such design tasks as DRC, DRM, simulation, analysis, verification, validation, and so on.

The system 1100 can include a computer program product for design analysis. The computer program product is embodied in a non-transitory computer readable medium and can comprise code for identifying a cell and multiple instances of the cell within a semiconductor design that includes a plurality of cells and a plurality of hierarchical design levels, where the cell and the multiple instances of the cell comprise the plurality of cells; code for generating virtual hierarchical layer (VHL) shapes based on polygons which overlap the cell, in response to an algorithm operation; and code for propagating the VHL shapes to a subsequent algorithm operation.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for design analysis comprising:
    identifying a cell and multiple instances of the cell within a semiconductor design that includes a plurality of cells and a plurality of hierarchical design levels where the cell and the multiple instances of the cell comprise the plurality of cells;
    generating, using one or more processors, virtual hierarchical layer (VHL) shapes, based on polygons which overlap the cell, in response to an algorithm operation, wherein the VHL shapes include geometric shapes not contained by the cell;
    propagating the VHL shapes to a subsequent algorithm operation; and
    producing, using one or more processors, a final design layout for fabrication wherein the final design layout is based on said generated VHL shapes.

2. The method of claim 1 further comprising updating the VHL shapes in response to the subsequent algorithm operation.

3. The method of claim 2 further comprising performing a coordinate transformation, as part of the updating of the VHL shapes, in order to put the VHL shapes onto common coordinates.

4. The method of claim 3 wherein the performing the coordinate transformation comprises computing a mirror image of the VHL shapes.

5. The method of claim 3 wherein the performing the coordinate transformation comprises computing a rotation of the VHL shapes.

6. The method of claim 2 further comprising filtering out shapes that will not be included as part of the updating of the VHL shapes.

7. The method of claim 6 wherein the filtering is based on processing of cell-level data shapes with the VHL shapes.

8. The method of claim 7 wherein the processing of the cell-level data shapes with the VHL shapes includes creating additional VHL shapes based on unresolved cell-level operations.

9. The method of claim 6 wherein the filtering out shapes includes executing an area command.

10. The method of claim 9 wherein the filtering out shapes includes:
identifying one or more polygons that, when combined, are larger than an area specified by the area command; and
associating the one or more polygons that are larger than the area specified by the area command with a negative selector model.

11. The method of claim 9 wherein the filtering out shapes includes:
identifying one or more polygons that, when combined with a virtual cell model from the cell to form a combined shape, results in an area of the combined shape that is larger than an area specified by the area command; and
associating the combined shape with a negative selector model.

12. The method of claim 6 wherein the filtering out shapes includes executing a span command.

13. The method of claim 12 wherein the filtering out shapes includes:
identifying one or more polygons that, when combined, are larger than an area specified by the span command; and
associating the one or more polygons that are larger than the area specified by the span command with a negative selector model.

14. The method of claim 12 wherein the filtering out shapes includes:
identifying one or more polygons that, when combined with a virtual cell model from the cell to form a combined shape, result in an area of the combined shape that is larger than an area specified by the span command; and
associating the combined shape with a negative selector model.

15. The method of claim 1 further comprising propagating the VHL shapes through a chain of operations.

16. The method of claim 1 wherein the VHL shapes include accumulated overlapping polygon information.

17. The method of claim 16 wherein the overlapping polygon information includes shapes from parent and sibling cells.

18. The method of claim 1 wherein the generating virtual hierarchical layer (VHL) shapes, based on polygons which overlap the cell, comprises expanding a boundary of the cell by an ambit value.

19. The method of claim 1 wherein the generating virtual hierarchical layer (VHL) shapes, based on polygons which overlap the cell, further includes identifying undetermined results from the cell.

20. The method of claim 19 further comprising generating an output virtual hierarchical layer (VHL) from an input virtual hierarchical layer (VHL), wherein the output VHL comprises fewer polygons than the input VHL.

21. A computer system for design analysis comprising:
a memory which stores instructions;
one or more processors coupled to the memory wherein the one or more processors are configured to:
identify a cell and multiple instances of the cell within a semiconductor design that includes a plurality of cells and a plurality of hierarchical design levels where the cell and the multiple instances of the cell comprise the plurality of cells;
generate virtual hierarchical layer (VHL) shapes, based on polygons which overlap the cell, in response to an algorithm operation, wherein the VHL shapes include geometric shapes not contained by the cell;
propagate the VHL shapes to a subsequent algorithm operation; and
produce a final design layout for fabrication wherein the final design layout is based on said generated VHL shapes.

22. The computer system of claim 21, wherein the one or more processors are configured to further update the VHL shapes in response to the subsequent algorithm operation.

23. The computer system of claim 22, wherein the one or more processors are configured to further perform a coordinate transformation, as part of the updating of the VHL shapes, in order to put the VHL shapes onto common coordinates.

24. The computer system of claim 23 wherein the performing the coordinate transformation comprises computing a mirror image of the VHL shapes.

25. A computer program product embodied in a non-transitory computer readable medium, which when executed by a processor, causes the processor to perform design analysis, the computer program product comprising instructions that when executed cause the processor to:
identify a cell and multiple instances of the cell within a semiconductor design that includes a plurality of cells and a plurality of hierarchical design levels where the cell and the multiple instances of the cell comprise the plurality of cells;
generate virtual hierarchical layer (VHL) shapes, based on polygons which overlap the cell, in response to an algorithm operation, wherein the VHL shapes include geometric shapes not contained by the cell;
propagate the VHL shapes to a subsequent algorithm operation; and
produce a final design layout for fabrication wherein the final design layout is based on said generated VHL shapes.

26. The computer program product of claim 25, wherein the instructions further cause the processor to update the VHL shapes in response to the subsequent algorithm operation.

27. The computer program product of claim 26, wherein the instructions further cause the processor to perform a coordinate transformation, as part of the updating of the VHL shapes, in order to put the VHL shapes onto common coordinates.

28. The computer program product of claim 27 wherein the performing the coordinate transformation comprises computing a mirror image of the VHL shapes.

* * * * *